May 7, 1935.                   A. NUTT                   2,000,714
                          LUBRICATION SYSTEM
                          Filed April 10, 1930

INVENTOR
ARTHUR NUTT
BY
ATTORNEY

Patented May 7, 1935

2,000,714

UNITED STATES PATENT OFFICE 2,000,714

LUBRICATION SYSTEM

Arthur Nutt, Eggertsville, N. Y., assignor, by mesne assignments, to The Reed Propeller Co., Inc., Garden City, N. Y., a corporation of New York Application April 10, 1930, Serial No. 443,042

16 Claims. (Cl. 184—6)

This application relates to an improved oiling system for internal combustion engines for aircraft and is more particularly concerned with oiling systems for motors of the inverted type.

Prior to this invention aeronautical motors of the inverted type have been used. Moreover, as is disclosed in a patent to Glenn H. Curtiss, No. 1,329,038, and as is disclosed in applicant's prior patent, No. 1,575,359, provision has been made in aeronautical motors of the usual type (not inverted) to insure that all surplus oil should be pumped from the bottom of the crank case and to provide what is called the "dry sump" scavenging system. Moreover, motors have been designed in which the oil used for the purpose of lubricating the cam shaft and cam shaft bearings flows down by gravity from the cam shaft housing into the crank case. However, so far as I am aware, there has never been provided an inverted motor in which the oil flows down by gravity from the crank case into the cam shaft housing and is there scavenged by pumps.

One of the objects of my invention is to provide an efficient motor of the inverted type in order that improved vision may be possible in an airplane equipped with such a motor.

A further object is the provision of an efficient dry sump lubrication system for a motor of the inverted type.

A further object is the provision of improved scavenging at the propeller end of internal combustion engines.

Further objects will be apparent from a reading of the subjoined specification and claims and from a consideration of the drawing.

In order to explain the invention more clearly one embodiment thereof is shown in the accompanying drawing, in which:

Fig. 1 is a vertical sectional view of an aeronautical motor provided with an oiling system designed according to my invention;

Fig. 2 is a vertical section of a part of the apparatus disclosed in Fig. 1 taken substantially on the line 2—2 and on an enlarged scale;

Fig. 3 is a vertical sectional view of part of the apparatus shown in Fig. 1 shown on an enlarged scale and looking in the same direction as the sectional view of Fig. 1 and showing further details of the pressure pump and the anti-propeller end scavenging pump; and Fig. 4 is a horizontal sectional view of the pump shown in Fig. 3 taken substantially on the line 4—4 of Fig. 3.

For illustration of my invention I have shown semidiagrammatically an internal combustion engine having a crank shaft 11 (see Fig. 1), cylinders 12, 13, 14, 15, 16 and 17 and a cam shaft 18. A cam shaft drive shaft 19 is provided to extend substantially vertically at the anti-propeller end of the engine and is adapted to be driven by the crank shaft. The engine is formed with a crank case 21 and a cam shaft housing 22.

Means are provided to lubricate the various bearings and moving parts of the engine. The oil which is used for this lubrication is furnished to a supply reservoir 20. From this supply reservoir the oil may be drawn through an oil pipe line 23, and oil passages 24 (Fig. 4), 25 and 26 into the oil pressure pump 27 (Fig. 3). From the oil pressure pump 27 the oil may be forced through oil passages 28 and 29 (Fig. 4) into a well 31 formed by the pressure screen housing 32. Thereafter, passing through the pressure screen 33, the oil may be forced through oil passage 34 and oil conduit 35 (Fig. 1) through various branch conduits to lubricate the various bearings of the motor. These branch conduits may include conduits 36, 37, 38, 39, 41, 42 and 43. By means of the branch conduits enumerated, the bearings for the crank shaft 11 are lubricated. Connected to the anti-propeller end bearing of the crank shaft 11 on the side opposite to the oil conduit 43 is another oil conduit 44 by which oil under pressure passes downward to lubricate the bearing 45 for the magneto drive shaft. Also connected with the oil conduit 44 is an oil conduit 46 through which oil is forced under pressure into the interior of the hollow cam shaft drive shaft 19 and downward through said hollow shaft. Adjacent to the lower end of said shaft a hole is provided which is adapted at one time during each revolution to align with an oil passage 47. A similar hole in the cam shaft 18 is adapted at times to align with the other end of the oil passage 47 and allow oil to be forced under pressure into the interior of the hollow cam shaft 18. The oil supplied to the interior of the cam shaft is utilized to lubricate the bearings for the said cam shaft. After the lubrication of the various bearings and moving parts the oil flows down by gravity to the bottom part of the crank case 21 and to the bottom part of the cam shaft housing 22. Depending upon the inclination of the motor the oil may flow toward the propeller end 48 or the anti-propeller end 49 of the crank case. From the propeller end 48 the oil can flow down by gravity through an oil pipe 50 into the propeller end of the cam shaft housing 22. From the oil sump 49 located at the anti-propeller end of the crank case, the oil can flow down through the annular passage 52 which surrounds the cam shaft drive shaft 19 into an oil sump 53 located at the anti-propeller end of the cam shaft housing. The oil at the propeller end of the cam shaft housing is scavenged by an oil pump 54 and delivered by means of a conduit 55 to the oil sump 53. An oil screen 56 is provided beneath the oil pump 54. The oil in the sump 53 is drawn through an oil screen 57 into an oil passage 58, (Fig. 4) by the oil pump 59 and is forced thereby through oil passages 61, 62 and 63. Thence, the oil is forced upward by the pump 59 through the oil conduit 64 into the supply reservoir 20.

The construction of the various pumps is shown more clearly in Figs. 2, 3 and 4. For instance, the pressure pump is driven by a shaft 65 which is formed as a continuation of the cam shaft drive shaft 19. A gear 66 is formed on said shaft 65 and meshes with a gear 67 formed on an idler shaft 68 to form collectively a gear pump of ordinary design. Similarly, the anti-propeller end scavenger pump comprises a gear 71 formed on the shaft 65 and a gear 72 formed on the idler shaft 68 and meshing with the gear 71 so as to form in a like manner a gear pump of ordinary design.

The scavenger pump at the propeller end of the cam shaft is driven by the cam shaft. Secured on the forward end of the cam shaft is a gear wheel 73 which meshes with and drives a gear wheel 74 mounted on a shaft 75. The shaft 75 carries at its opposite end within the pump 54 a gear 76 which meshes with a gear 77 secured to the idler shaft 78.

In the operation of this oiling system the oil is withdrawn from the supply reservoir 20 by the pressure pump 27 and delivered through the main pressure supply conduit 35 and the various branch conduits to the various bearings of the motor. Dripping down from these bearings the oil is collected in the cam shaft housing either directly by dripping down from the cam shaft bearings or by flowing down by gravity from the forward end of the crank case through the oil conduit 50 or from the rearward end of the crank case through the annular passage 52. The oil at the forward end of the cam shaft housing is scavenged by the pump 54 and positively delivered to the rear end of said housing through the conduit 55. The oil at the rear end of the cam shaft housing including the oil delivered thereto through the conduit 55 is scavenged by the pump 59 and delivered through the conduit 64 to the supply reservoir 20. Thus, regardless of the attitude of the motor, the oil at both ends of the cam shaft housing is withdrawn and delivered to the supply reservoir 20. The provision whereby the pump 54 delivers to the sump 53 rather than directly to the supply reservoir 20 minimizes the delivery of air to the supply reservoir 20 and prevents foaming. The provision of the two pumps, one located at the rear end of the cam shaft housing, insures that the lubrication system shall operate at all times as a dry sump system. The provision by which the pump 54 is located at the forward end of the cam shaft housing instead of being located adjacent to the pressure pump 27 and the scavenger pump 59 similar to the arrangement shown in my prior Patent No. 1,575,359 insures a more positive delivery of oil from the propeller end, and insures that the pump will scavenge properly in a long glide, which might not be the case if an attempt was made to suck the oil from this location rather than force it therefrom, inasmuch as trouble has been encountered in the inability to scavenge the forward end on an engine in a glide when the scavenging pump is located at the anti-propeller end.

By the positioning of the scavenger pumps in the cam shaft housing instead of the crank case, I am enabled to position a scavenging pump at each end of the motor without the addition of any extra shafts for driving the propeller end scavenging pump such as would be necessary were the scavenging pumps positioned in the crank case. I am able to do this by the utilization of the cam shaft for two functions instead of one, the first being the usual function of operating the cams and the second being the added function of driving the propeller end scavenging pump.

It is to be understood that the above described embodiment of the invention is for the purpose of illustration only and various changes may be made therein without departing from the spirit and scope of the invention.

I claim as my invention:

1. In a lubrication system for internal combustion motors, a plurality of motor cylinders, a crank shaft positioned above said cylinders, a case for enclosing said crank shaft, a cam shaft extending across said cylinders at the outer cylinder ends, a cam shaft housing enclosing said cam shaft and attached to said cylinders at their outer ends, and conduits connecting said crank shaft case and said cam shaft housing, whereby oil may flow by gravity from said crank shaft case to said cam shaft housing.

2. In a lubrication system for an inverted internal combustion motor, a cam shaft, a cam shaft housing in which oil from the whole of said engine is adapted to be collected, a scavenger pump positioned at the forward end of said cam shaft housing for withdrawing oil from said forward end, and a second scavenging pump positioned at the rear end of said cam shaft housing for withdrawing oil from said rear end, said scavenger pumps being driven by means associated with said camshaft.

3. In a lubrication system for internal combustion engines, a plurality of cylinders, a crank shaft positioned above said cylinders, a cam shaft positioned below said cylinders, cam shaft bearings, a cam shaft housing in which oil from said engine is adapted to be collected, means for withdrawing oil from the front part of said cam shaft housing, and separate means for withdrawing oil from the rear part of said cam shaft housing.

4. In a lubrication system for an internal combustion motor, a crank shaft, a substantially vertical, hollow shaft driven by said crank shaft, a substantially hollow cam shaft driven by said vertical drive shaft, and means for transferring oil under pressure from said hollow drive shaft to said hollow cam shaft.

5. In a pressure lubrication system for an internal combustion motor having a source of lubricant supply, a crankshaft, a substantially vertical drive shaft driven by said crankshaft, an oil pump in communication with said source of lubricant supply and driven by said vertical drive shaft, and a hollow camshaft also driven by said vertical drive shaft, said vertical drive shaft having a lubricant conduit in communication with the pump and the camshaft.

6. In a pressure lubrication system for an internal combustion motor, a source of lubricant supply, a crankshaft having bearings, a substantially vertical, hollow shaft driven by said crankshaft, a substantially hollow camshaft driven by said vertical drive shaft, a pump driven by said vertical drive shaft, conduits connecting said pump with the lubricant supply and with said bearings, and conduits connecting said hollow drive shaft with said bearings and with the hollow camshaft.

7. In a lubricating system for internal combustion motors, a plurality of motor cylinders, a crankshaft positioned over the ends of said cylinders, a crankcase for enclosing said crankshaft and adapted to receive oil therefrom, a camshaft below the opposite ends of said cylinders, a camshaft housing enclosing said camshaft, and conduits open to said crankcase and to said camshaft housing at the opposite ends thereof, respectively, said conduits forming oil drain passages into said housing.

8. In a lubricating system for internal combustion motors, a plurality of motor cylinders, a crankshaft positioned over the ends of said cylinders, a crankcase for enclosing said crankshaft and adapted to receive oil therefrom, a camshaft below the opposite ends of said cylinders, means for driving said camshaft, a camshaft housing enclosing said camshaft, conduits open to said crankcase and to said camshaft housing at the opposite ends thereof, respectively, said conduits forming oil drain passages into said housing, and scavenger oil pumps toward each end of said camshaft housing driven from said camshaft driving means.

9. In a lubricating system for internal combustion motors, a plurality of motor cylinders, a crankshaft positioned at the upper ends of said cylinders, a crankcase for enclosing said crankshaft and adapted to receive oil therefrom, a camshaft at the opposite ends of said cylinders, a camshaft housing enclosing said camshaft, a substantially vertical shaft at one end of said motor having a driving connection with said camshaft and with said crankshaft, and a hollow enclosure surrounding said vertical shaft, open respectively to said crankcase and to said camshaft housing, said enclosure forming an oil drain passage to said housing.

10. In a lubricating system for internal combustion motors, a plurality of motor cylinders, a crankshaft positioned at the upper ends of said cylinders, a crankcase for enclosing said crankshaft and adapted to receive oil therefrom, a camshaft at the opposite ends of said cylinders, a camshaft housing enclosing said camshaft, a substantially vertical shaft at one end of said motor in driving connection with said camshaft and with said crankshaft, a hollow enclosure surrounding said vertical shaft, said enclosure forming an oil drain passage to said housing, and a conduit at the opposite end of said motor open respectively to said crankcase and to said housing, and through which oil is adapted to drain into said housing.

11. In a lubricating system for internal combustion motors, a plurality of motor cylinders, a crankshaft positioned at the upper ends of said cylinders, a crankcase for enclosing said crankshaft and adapted to receive oil therefrom, a camshaft at the opposite ends of said cylinders, a camshaft housing enclosing said camshaft, a substantially vertical shaft at one end of said motor in driving connection with said camshaft and with said crankshaft, a hollow enclosure surrounding said vertical shaft, said enclosure forming an oil drain passage to said housing, a conduit at the opposite end of said motor open respectively to said crankcase and to said housing, and through which oil is adapted to drain into said housing, a scavenger oil pump toward one end of said camshaft housing, and a second scavenger oil pump toward the other end of said camshaft housing, both said oil pumps being driven by a mechanism including said vertical shaft.

12. In an inverted in-line internal combustion engine, in combination, a plurality of cylinders, a crankshaft above said cylinders from which oil is adapted to drain, a crankcase enclosing said shaft and adapted to receive said oil, a camshaft across the lower ends of said cylinders from which oil is adapted to drain, means for driving said camshaft, a camshaft housing enclosing said camshaft for receiving oil, conduits connecting said crankcase with said housing whereby oil draining from said crankshaft may drain by gravity to accumulate in said camshaft housing, and a scavenging pump driven from said camshaft driving means.

13. In an internal combustion engine, in combination, a crankshaft, a hollow camshaft adapted to receive oil under pressure, a hollow drive shaft for establishing a driving connection between said crankshaft and said camshaft, an oil pump, a connection for feeding the oil delivered by said pump to the hollow of said drive shaft, and a connection for feeding said oil from the hollow of said drive shaft to the hollow of said camshaft.

14. In an internal combustion engine having a pressure lubricating system, in combination, a crankshaft, a hollow oil-containing camshaft, an oil pump, a hollow drive shaft for establishing a driving connection from said crankshaft to said camshaft, and connections between said pump and the hollow of said drive shaft, and between the hollow of said drive shaft and the hollow of said camshaft whereby said drive shaft hollow serves as an oil conduit in the conduction of oil from said pump to said camshaft.

15. In an internal combustion engine, a plurality of cylinders inverted and in line, a crankcase, a crankshaft therein, a hollow camshaft arranged beneath said crankcase, a straight hollow shaft arranged above said crankshaft and in parallelism therewith, means for driving said camshaft from the end of said crankshaft, and oil passageways in said means for delivering oil into said camshaft.

16. In an internal combustion engine, a plurality of cylinders inverted and in line, a crankcase, a crankshaft therein, a hollow camshaft arranged beneath said crankcase, a straight hollow shaft arranged above said crankshaft and in parallelism therewith, means for driving said camshaft from the end of said crankshaft, oil passageways in said means for delivering oil into said camshaft, a housing for said camshaft, said housing also forming the oil sump for said engine.

ARTHUR NUTT.